(12) United States Patent
Vile et al.

(10) Patent No.: US 11,022,166 B2
(45) Date of Patent: Jun. 1, 2021

(54) LOCK NUT ARRANGEMENT FOR ADJUSTABLE THREADED SHAFT

(71) Applicant: WHEELSURE TECHNOLOGIES LIMITED, Ampthill (GB)

(72) Inventors: David Vile, Bedfordshire (GB); Gerhard Dodl, Bedfordshire (GB)

(73) Assignee: Wheelsure Technologies Limited

( * ) Notice: Subject to any disclaimer, the term of this patent is extended or adjusted under 35 U.S.C. 154(b) by 270 days.

(21) Appl. No.: 15/752,027

(22) PCT Filed: Jul. 7, 2016

(86) PCT No.: PCT/GB2016/052042
§ 371 (c)(1),
(2) Date: Feb. 12, 2018

(87) PCT Pub. No.: WO2017/029471
PCT Pub. Date: Feb. 23, 2017

(65) Prior Publication Data
US 2018/0238378 A1     Aug. 23, 2018

(30) Foreign Application Priority Data
Aug. 17, 2015  (GB) .................................... 1514570

(51) Int. Cl.
*F16B 39/16*  (2006.01)
*F16B 41/00*  (2006.01)
*F16B 37/14*  (2006.01)

(52) U.S. Cl.
CPC ............ *F16B 39/16* (2013.01); *F16B 41/002* (2013.01); *F16B 37/14* (2013.01)

(58) Field of Classification Search
CPC ...................................................... F16B 39/16
(Continued)

(56) References Cited

U.S. PATENT DOCUMENTS

| 771,733 A | * | 10/1904 | Johnson | F16B 39/12 411/245 |
| 862,447 A | * | 8/1907 | Christy | F16B 39/16 411/235 |

(Continued)

FOREIGN PATENT DOCUMENTS

GB      2367600      10/2003

OTHER PUBLICATIONS

International Search Report and Written Opinion dated Oct. 4, 2016, from International Stage PCT Application No. PCT/GB2016/052042.

*Primary Examiner* — Flemming Saether
(74) *Attorney, Agent, or Firm* — Keusey & Associates, P.C.

(57) ABSTRACT

A threaded shaft and retaining nut assembly having a shaft 4 with a first thread of a first hand along the shaft 4, and a second thread of a second hand opposite to said first hand along the shaft 4. The second thread at least partially overlaps said first thread. A tubular member is screwingly engageable for winding the shaft 4 into and out of the tubular member 3. A retaining nut 10 is screwingly engageable with the second thread for winding the retaining nut 10 back and forth along the shaft 4. In use, the second nut is engageable against an end of the tubular member 3 to prevent unintentional winding of said shaft. A locking member 12 is engageable with the tubular member 3 and the retaining nut 10 to effect a non-rotatable coupling between said tubular member 3 and retaining nut.

14 Claims, 4 Drawing Sheets

(58) Field of Classification Search
USPC .................. 411/244, 245, 232, 234, 235
See application file for complete search history.

(56) References Cited

U.S. PATENT DOCUMENTS

| | | | | |
|---|---|---|---|---|
| 1,174,759 | A | * | 3/1916 | Passmore ............... F16B 39/16 |
| | | | | 411/235 |
| 1,244,039 | A | * | 10/1917 | Droll ..................... F16B 39/12 |
| | | | | 411/223 |
| 1,374,963 | A | * | 4/1921 | Stevenson .............. F16G 11/12 |
| | | | | 403/44 |
| 1,480,253 | A | * | 1/1924 | Fisher ..................... F16B 7/06 |
| | | | | 403/44 |
| 1,490,024 | A | * | 4/1924 | Quinn .................... F16B 39/16 |
| | | | | 411/235 |
| 2,194,020 | A | * | 3/1940 | Huffer .................... F16B 39/16 |
| | | | | 411/244 |
| 4,018,132 | A | | 4/1977 | Abe |
| 5,429,447 | A | * | 7/1995 | Wood ...................... F16B 7/06 |
| | | | | 403/290 |

\* cited by examiner

LOCK NUT ARRANGEMENT FOR ADJUSTABLE THREADED SHAFT

BACKGROUND OF THE INVENTION

1. Field of the Invention

The present invention relates to threaded shafts that are screwingly engageable in threaded openings to enable adjustment of the length of engagement in the opening and more particularly to locking arrangements for locking the shaft relative to the opening to prevent unintentional movement therebetween.

2. The Prior Art

Externally threaded shafts which are screwingly engageable in a complementary internally threaded opening in a bar are well known in applications where the depth of engagement of the shaft within the bar needs to be adjusted so as to vary the overall length of the shaft/bar combination. For example track rods used to control the tracking on vehicle wheels need to be adjusted to vary the tracking. Also, turnbuckles are used in train tracks to operate points also need to be adjusted to suit different requirements. In most applications, it is, however, important that once the shaft has been adjusted to a set position, it does not unintentionally move from that position. In some applications, such as turnbuckles or track rod, where the assembly is subject to vibration, it is therefore necessary to provide some sort of locking system to prevent unintentional rotation of the bar relative to the socket.

The known solution to this problem is to use a locking nut which engages with and is carried on the thread carried on the other surface of the shaft. Once the shaft has been screwed into the required position within the bar, the locking nut is screwed tightly against the end of the bar so as to be in tight frictional abutment therewith. The friction between the locking nut and the end of the bar then imposes a minimum torque which must be applied in order for the nut, and hence the shaft, to be un-wound from the bar. In practice, however, it has been found the no matter how tightly the locking nut is wound against the shaft, the vibration to which the nut is exposed causes the locking nut to loosen over time, freeing the shaft to rotate within the bar.

Applicants own earlier patent no. GB2367600 discloses a locking nut arrangement for use with threaded shafts such as wheel studs. The stud is provided with a first thread of a first hand which extends from the end of the stud along a first portion of the stud, and a second thread of a second hand which extends from the end of the first thread along the remainder of the stud. A nut assembly is then provided which comprises a pair of nuts—a first having an internal thread of the first hand which complements the first thread of the stud and a second nut having an internal thread of the second hand which complements the second thread of the stud. In order to use the nut assembly, the second nut is first screwed onto the second thread, after which the first nut is screwed onto the first thread until it abuts against the second nut. A cap is then engaged over and secured in place over both the first and second nuts so as to rotationally lock them together. Due to the nuts being of different hand, the cap thereby prevents either nuts being further wound onto or off of the stud.

This system works well when applied to threaded studs, the engagement length of which is pre-defined so that the length of the first and second threads can be pre-set. However, it does not work in applications such as those outlined above where a threaded shaft engages in a threaded opening in a bar due to the fact that a wide range of adjustment must be allowed for and hence it is impossible to pre-define the length of the first and second threaded which would need to be formed on the shaft.

SUMMARY OF THE INVENTION

According to the present invention there is provided a threaded shaft and retaining nut assembly comprising a threaded shaft having a first thread of a first hand extending at least partially along the shaft, a second thread of a second hand opposite to said first hand extending at least partially along the shaft, said second thread at least partially overlapping said first thread, a tubular member having an internal thread extending at least partially along its length complementary to said first thread in which the first thread is screwingly engageable for winding the shaft into and out of the tubular member, and a retaining nut having an internal thread complementary to said second thread which is screwingly engageable with the second thread for winding the retaining nut back and forth along the shaft, the second nut, in use, being engageable against an end of the tubular member to prevent unintentional winding of said shaft into and out of the tubular member, and a locking member engageable with the tubular member and the retaining nut to effect a non-rotatable coupling between said tubular member and retaining nut and hence prevent them from being wound along the shaft in either direction, the pitch of the first thread being different to the pitch of the second thread An assembly in accordance with the invention has the advantage that due to the formation of the two threads on the same portion of the shaft as a so called symmetrical thread, the shaft can be would into the tubular member by any distance allowed by the first thread and the retaining nut can be would along and locked in place thereagainst. As a result, the locking point no longer has to be predefined in the design stage and the system can therefore be used with adjustable shafts of the types outlined above and discussed further below.

Preferably, the first thread is coarser than the second thread. The tubular member preferably has an outer profile who radius changes—for example a hexagonal profile, as toothed profile or the like, with the cover sleeve having and internal profile to complement the outer profile of the tubular member for effecting a non-rotatable coupling therebetween. In a particularly preferred embodiment, the outer profile of the tubular member matches the outer profile of the retaining nut, and the cover sleeve has a single internal profile extending therethrough which non-rotatably engages with both the tubular member and the retaining nut. However, the two outer profiles may be different with the internal profile of the cover sleeve extending from one end being different from the one extending from the other.

Preferably, the locking member is a cover sleeve which is slidably engageable over at least an end of the tubular member and the retaining nut and non-rotatably engageable with said tubular member and retaining nut, said sleeve being engageable over said tubular member and retaining nut when they are in abutment so as to non-rotatably couple them together and hence prevent them from being wound along the shaft in either direction.

BRIEF DESCRIPTION OF THE DRAWINGS

In order that the invention may be well understood, there will now be described an embodiment thereof, given by way of example, reference being made to the accompanying drawings, in which.

DETAILED DESCRIPTION OF THE PREFERRED EMBODIMENT

Figure 1:
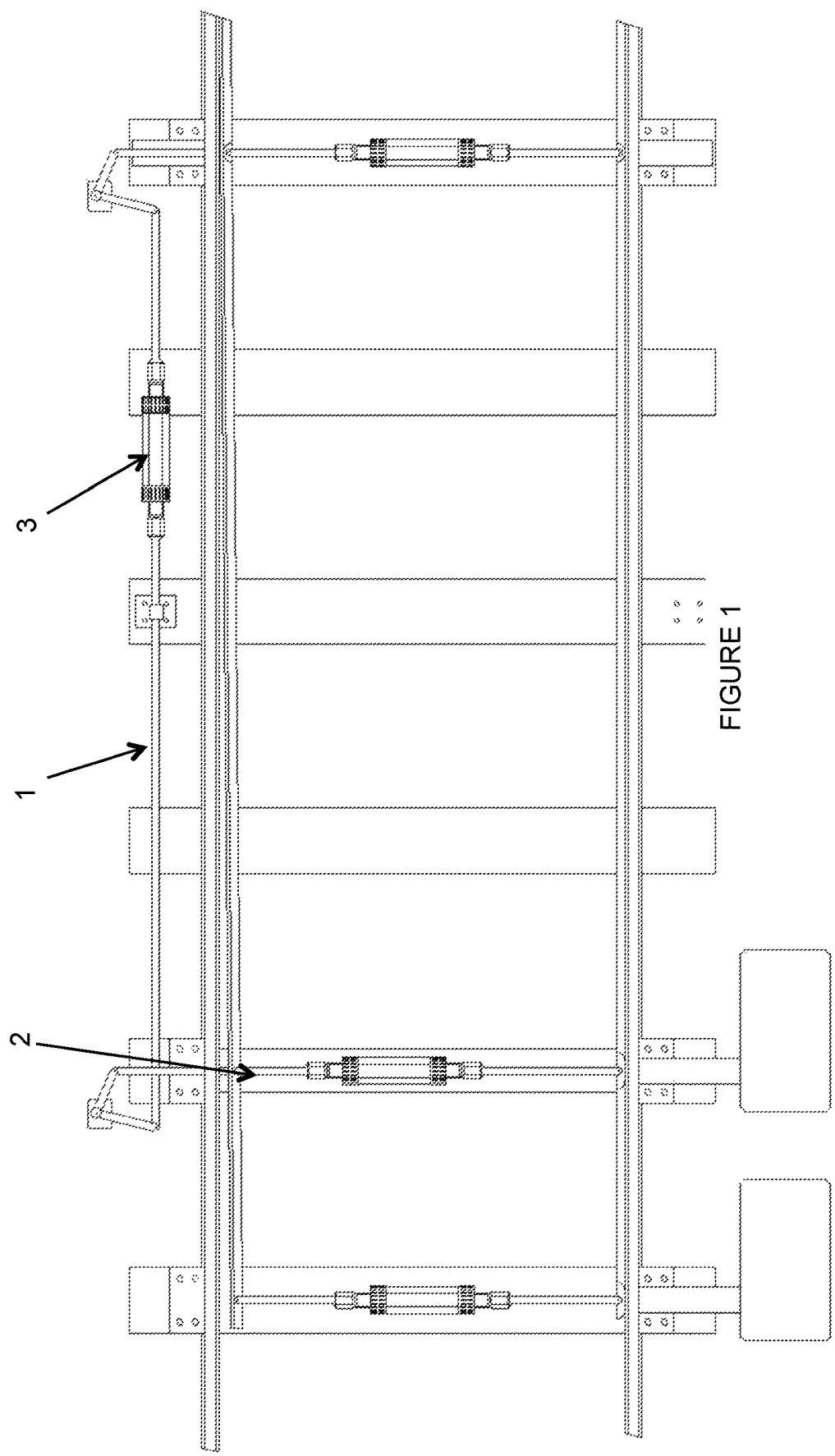
FIG. 1 is a top view of a set of railway points which includes adjustable linkage bars of the type with which the present invention may be utilised.

Referring first to FIG. 1, there is shown a plan of part of a railway track which includes points for enabling trains to change tracks and the like. The points system includes a number of linkage bars such as longitudinal linkage bar 1 and transverse linkage bar 2. These bars are designs to be adjustable to different lengths by winding threaded portions of the shafts into and out of threaded tubular linkage members such as at 3. Due to the vibrations and the like to which system is exposed when trains travel along, the adjustable linkages have a tendency to move causing loosening or tightening of the bars and moving the linkages out of proper alignment.

Figure 2:
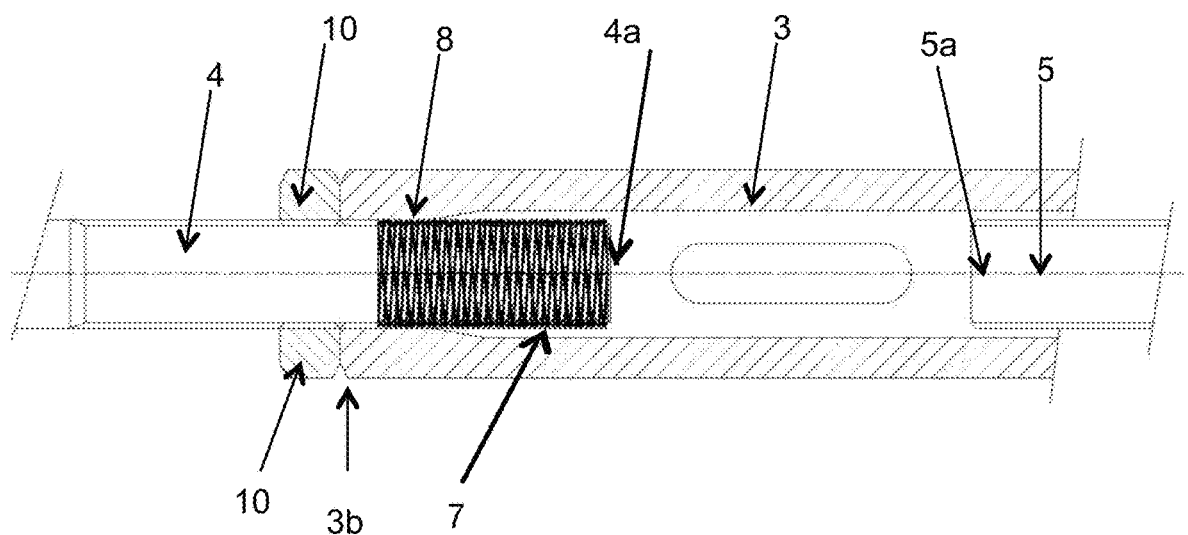
FIG. 2 is a section view of an adjustable threaded bar of the type of the present invention.

FIG. 2 shown a sectional view through one of the tubular linkage members 3 with the opposing ends 4a, 5a of the engaging linkage bars 4, 5 screwingly engaged therein. The configuration of the invention will be described in relation to the left hand end only of FIG. 2, but it will be understood that the invention applies equally to both ends.

The linkage bar 4 has a threaded section 7 on its outer surface which extends from the end 4a thereof. The threaded section is cut as a so called symmetrical thread having two threads cut into the same surface. In the case of the present invention, the first thread is a standard right hand thread and has a coarse pitch. The second thread is a left hand thread and has a fine pitch.

The linkage member 3 has an internal thread 8 cut into its inner tubular surface extending from a first end 3a in which the linkage bar 4 engages. The internal thread is a right hand coarse pitch thread complementary to the first thread on the bar 4, so that the bar 4 is screwingly engageable with the first end 3a of the linkage member 3 by means of the first thread.

A retaining or lock nut 10 is also provided having a left hand fine pitch thread to complement the left hand thread formed on the threaded section 7 of the linkage bar 4. The lock nut 10 is therefore screwingly engageable with the second thread and can therefore be wound along the linkage bar 4.

Figure 3:
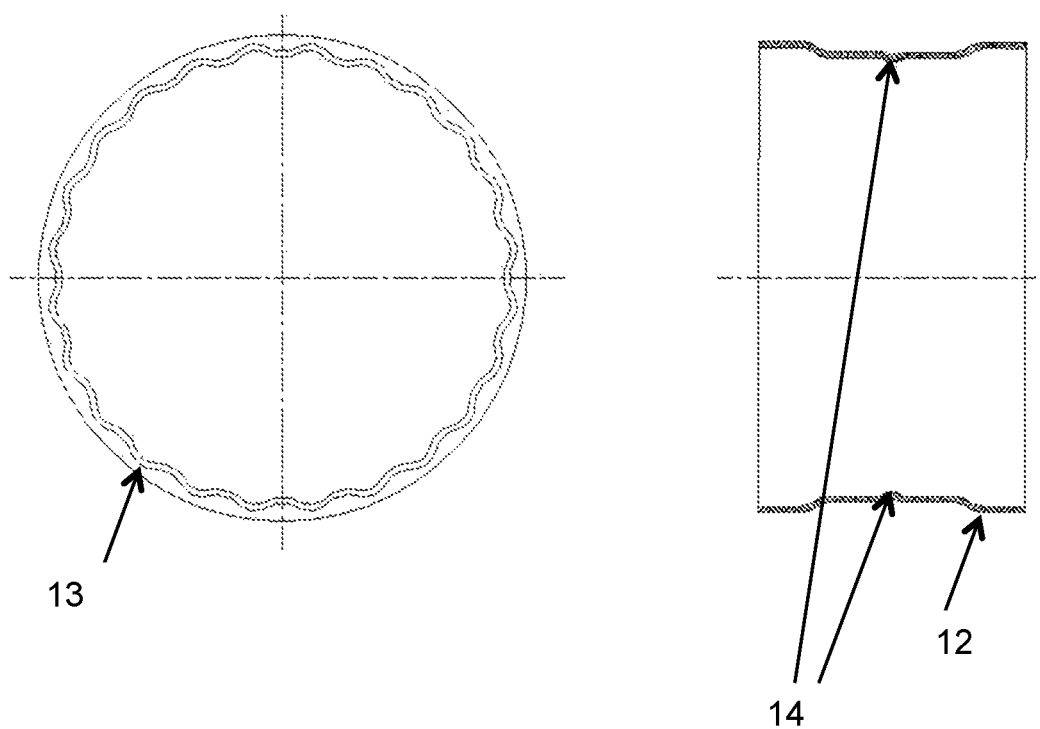
FIG. 3 is a radial cross-sectional view and a longitudinal cross-sectional view of a cover sleeve which forms part of the present invention.
Figure 4:
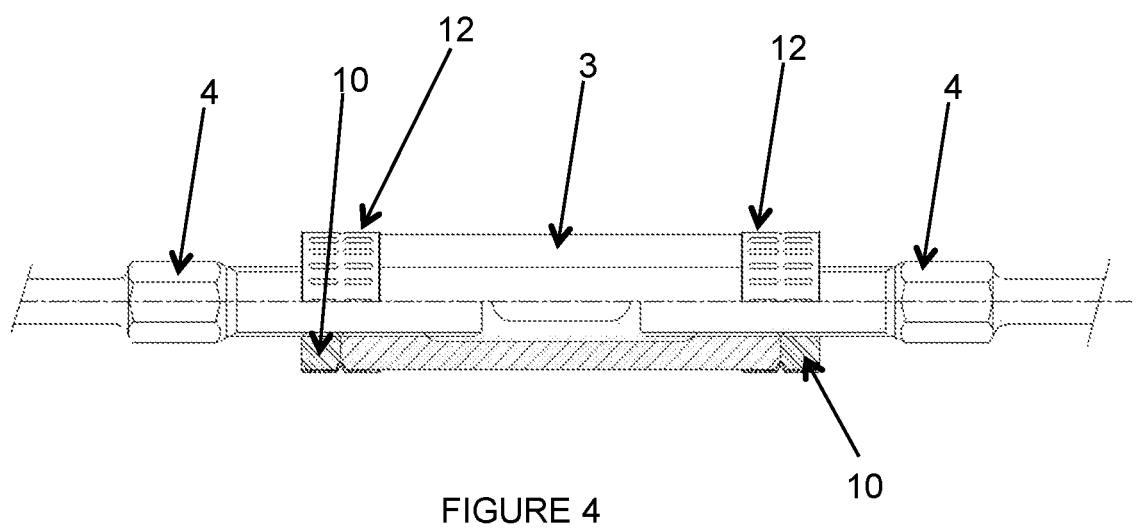
FIG. 4 is a partially cut away view of the assembly of the invention.

The assembly of the invention also includes a retaining cap 12, an embodiment example of which is shown in FIG. 3. Both the tubular linkage member 3 and the lock nut 10 are formed with a matching hexagonal outer profile as shown in FIG. 4, and the retaining cap 12 is formed with a waved or toothed profile 13 on its inner surface which engages with the corners of the hexagonal outer profile of the linkage member 3 and the lock nut 10 so as to enable the cap 12 to be slid axially across both the nut 10 and the linkage member 3 to create a rotationally fast connection with each of the nut 10 and the linkage member 3. In this way, the cap 12 acts as a bridge between the nut 10 and the linkage member 3 which constrains the two components against relative rotational movement. Since the threads of the linkage member 3 and the lock nut 10 are of opposite had, when the cap 12 is positioned over the two parts when they are already in abutting engagement as shown in FIG. 4, the two parts are locked together and hence the linkage bar 4 is prevented from being further adjusted relative to the tubular linkage member 3.

The cap 12 includes a central detent in the form of a circumferentially extending rib 14 projecting from its inner surface, the inner diameter of said rib 14 being smaller than the across the corners dimension of the nut 10 and the linkage member 3. The material of the cap 12 is resiliently deformable so as to enable the rib 14 to deform outwards to allow passage over the nut 12 as the cap is moved into position before snapping back into a gap between the adjacent corners of the nut 12 and tubular member 3 so as to retain the cap in position.

In order to adjust the linkage bar 4, the cap is removed from across the nut 10 and the linkage member 3 by applying sufficient axial forced to cause the rib 14 to radially expand, thereby allowing the cap 12 to be slip off of the nut 10 and the tubular member 3. Once the cap is removed, the lock nut 10 can then be freely wound away from the end 3a of the linkage member 3 and the linkage bar 4 then adjusted.

It will be understood that the design of the cap may be varied within the scope of the invention—the important feature being that it simultaneously non-rotatable connect to both the lock nut 10 and the tubular linkage member 3 to provide a rotational lock bridge between the two parts. Instead of a cap, a pin or bolt may be provided which extends axially through aligned openings in both the lock nut 10 and the tubular member 12.

What is claimed is:

1. A threaded shaft and retaining nut assembly comprising:
   a first threaded shaft having: a first thread of a first hand extending at least partially along said first threaded shaft, a second thread of a second hand opposite to said first hand extending at least partially along said first threaded shaft, said second thread at least partially overlapping said first thread, a pitch of the first thread is different from the second thread; and a second threaded shaft having a third thread of a first hand extending at least partially along said second threaded shaft, a fourth thread of a second hand opposite to said first hand extending at least partially along said second threaded shaft, said fourth thread at least partially overlapping said third thread;
   a tubular member having: a first end and a first internal thread extending from said first end at least partially along its length complementary to said first thread in which the first thread is engaged for winding said first threaded shaft into and out of the first end of the tubular member; and a second end and a second internal thread extending from said second end at least partially along its length complementary to said third thread in which the third thread is engaged for winding the second threaded shaft into and out of the second end of the tubular member; whereby rotation of said tubular member varies the distance between remote ends of said first and second threaded shafts;
   a first retaining nut having a third internal thread complementary to said second thread which is engaged with the second thread for winding the first retaining nut back and forth along the first threaded shaft, the first retaining nut, in use, being engageable and abutable against the first end of the tubular member to prevent unintentional winding of said first threaded shaft into and out of the tubular member;

a second retaining nut having a fourth internal thread complementary to said fourth thread which is engaged with the fourth thread for winding said second retaining nut back and forth along the second threaded shaft, the second retaining nut, in use, engages and abuts against the second end of the tubular member to prevent unintentional winding of said second treaded shaft into and out of the tubular member; and a first locking cap comprising a cover sleeve having an inner surface with a circumferential rib projecting from the inner surface that is positioned in between the first end of the tubular member and the first retaining nut to hold the first locking cap in position, the inner surface further including an internal waved profile extending on either side of the rib, with one side of the waved profile engaging with corners of the first end of the tubular member and the other side of the waved profile engaging the corners of the first retaining nut, the first locking cap being made from a resilient material radially expandable to move the rib over the first retaining nut out of position for removal and adjustment and to further move the rib over the first retaining nut back into position so that the cover sleeve is engageable over the first end of the tubular member and the first retaining nut to effect a non-rotatable coupling between the first end of the tubular member and the first retaining nut and hence prevent them from being wound along the first threaded shaft in either direction; and a second locking cap comprising a cover sleeve having an inner surface with a circumferential rib projecting from the inner surface that is positioned in between the second end of the tubular member and the second retaining nut to hold the second locking cap in position, the inner surface further including an internal waved profile extending on either side of the rib, with one side of the waved profile engaging with the corners of the second end of the tubular member and the other side of the waved profile engaging the corners of the second retaining nut, the second locking cap being made from a resilient material radially expandable to move the rib over the second retaining nut out of position for removal and adjustment and to further move the rib over the second retaining nut back into position so that the cover sleeve is engageable over the second end of the tubular member and the second retaining nut to effect a non-rotatable coupling between the tubular member and the second retaining nut and hence prevent them from being wound along the second threaded shaft in either direction.

2. The assembly according to claim 1, wherein the first thread is coarser than the second thread.

3. The assembly according to claim 1, wherein the first locking cap is slidably engageable over the first threaded shaft prior to winding into the first end of the tubular member, said first locking cap being slid axially over the first retaining nut and the first end of the tubular member when they are in abutment so as to non-rotatably couple and bridge them together and hence prevent them from being wound along the first threaded shaft in either direction; wherein the second locking cap is slidably engageable over the second threaded shaft prior to winding into the second end of the tubular member, said second locking cap being slid axially over the second retaining nut and the second end of the tubular member when they are in abutment so as to non-rotatably couple and bridge them together and hence prevent them from being wound along the second threaded shaft in either direction.

4. The assembly according to claim 3, wherein the tubular member has an outer profile with a varying radius and the locking caps have an internal profile which complements the outer profile of the tubular member for effecting a non-rotatable coupling therebetween.

5. The assembly according to claim 4, wherein the first end of the tubular member has an outer profile that matches an outer profile of the first retaining nut, and the first locking cap includes an internal profile extending therethrough which non-rotatably engages with both the first end of the tubular member and the first retaining nut; and wherein the second end of the tubular member has an outer profile that matches an outer profile of the second retaining nut, and the second locking cap includes an internal profile extending therethrough which non-rotatably engages with both the second end of the tubular member and the second retaining nut.

6. The assembly according to claim 1, wherein the first and second internal threads of the tubular member meet to form a single threaded aperture which extends longitudinally substantially the whole length of the tubular member.

7. The assembly according to claim 1, wherein the first and second internal threads of the tubular member are longitudinally separated from each other by an unthreaded internal cavity of the tubular member.

8. The assembly according to claim 1, wherein the first thread is a right hand thread and the second thread is a left hand thread.

9. The assembly according to claim 1, wherein the first threaded shaft, the second threaded shaft and tubular member together form an adjustable linkage bar, the length of which is adjusted by rotating the tubular member to wind the threaded shafts into and out of the tubular member.

10. The assembly of claim 1, wherein the rib is centrally located within the sleeve.

11. The assembly of claim 1, wherein the rib is centrally located within the waved profile.

12. A threaded shaft and retaining nut assembly comprising:

a first threaded shaft having: a first thread of a first hand extending at least partially along said first threaded shaft, a second thread of a second hand opposite to said first hand extending at least partially along said first threaded shaft, said second thread at least partially overlapping said first thread, a pitch of the first thread is different from the second thread; and a second threaded shaft having a third thread of a first hand extending at least partially along said second threaded shaft, a fourth thread of a second hand opposite to said first hand extending at least partially along said second threaded shaft, said fourth thread at least partially overlapping said third thread;

a tubular member having: a first end and a first internal thread extending from said first end at least partially along its length complementary to said first thread in which the first thread is engaged for winding said first threaded shaft into and out of the first end of the tubular member; and a second end and a second internal thread extending from said second end at least partially along its length complementary to said third thread in which the third thread is engaged for winding the second threaded shaft into and out of the second end of the tubular member; whereby rotation of said tubular member varies the distance between remote ends of said first and second threaded shafts;

a first retaining nut having a third internal thread complementary to said second thread which is engaged with the second thread for winding the first retaining nut back and forth along the first threaded shaft, the first retaining nut, in use, being engageable and abutable against the first end of the tubular member to prevent unintentional winding of said first threaded shaft into and out of the tubular member;

a second retaining nut having a fourth internal thread complementary to said fourth thread which is engaged with the fourth thread for winding said second retaining nut back and forth along the second threaded shaft, the second retaining nut, in use, engages and abuts against the second end of the tubular member to prevent unintentional winding of said second treaded shaft into and out of the tubular member;

a first locking cap comprising a cover sleeve having an inner surface with a circumferential rib projecting from the inner surface that is positioned in between the first end of the tubular member and the first retaining nut to hold the first locking cap in position, the inner surface further including an internal toothed profile extending on either side of the rib, with one side of the toothed profile engaging with corners of the first end of the tubular member and the other side of the toothed profile engaging with the corners of the first retaining nut, the first locking cap being made from a resilient material radially expandable to move the rib over the first retaining nut out of position for removal and adjustment and to further move the rib over the first retaining nut back into position so that the cover sleeve is engageable over the tubular member and the first retaining nut to effect a non-rotatable coupling between said first end of the tubular member and the first retaining nut and hence prevent them from being wound along the first threaded shaft in either direction; and a second locking cap comprising a cover sleeve having an inner surface with a circumferential rib projecting from the inner surface that is positioned in between the second end of the tubular member and the second retaining nut to hold the second locking cap in position, the inner surface further including an internal toothed profile extending on either side of the rib, with one side of the toothed profile engaging with corners of the second end of the tubular member and the other side of the toothed profile engaging the corners of the second retaining nut, the second locking cap being made from a resilient material radially expandable to move the rib over the second retaining nut out of position for removal and adjustment and to further move the rib over the second retaining nut back into position so that the cover sleeve is engageable over the second end of the tubular member and the second retaining nut to effect a non-rotatable coupling between the second end of the tubular member and the second retaining nut and hence prevent them from being wound along the second threaded shaft in either direction.

13. The assembly of claim 12, wherein the rib is centrally located within the sleeve.

14. The assembly of claim 12, wherein the rib is centrally located within the toothed profile.

* * * * *